United States Patent
Goettker

Patent Number: 5,826,682
Date of Patent: Oct. 27, 1998

[54] DISK BRAKE ASSEMBLY FOR WHEEL OF A TRAILER

[75] Inventor: Bernhardt P. Goettker, Escondido, Calif.

[73] Assignee: Unique Functional Products, San Marcos, Calif.

[21] Appl. No.: 706,437

[22] Filed: Aug. 30, 1996

[51] Int. Cl.$^6$ .............................. F16D 65/14; F16D 65/38
[52] U.S. Cl. .......................... 188/72.4; 188/73.1; 188/369
[58] Field of Search ................................ 188/184, 71.1, 188/72.1, 72.4, 73.31, 73.35, 73.36, 73.37, 73.38, 73.46, 73.47, 205 R, 218 A, 218 R, 369, 370

[56] References Cited

U.S. PATENT DOCUMENTS

| | | | |
|---|---|---|---|
| 3,405,784 | 10/1968 | Biabaud ................................ | 188/18 A |
| 3,658,160 | 4/1972 | Beller et al. ......................... | 188/73.37 |
| 3,949,839 | 4/1976 | Girauldon .............................. | 188/71.1 |
| 4,319,668 | 3/1982 | Johnson et al. ....................... | 188/72.4 |
| 4,360,083 | 11/1982 | Weisman ............................. | 188/218 A |
| 4,512,446 | 4/1985 | Chuwman et al. ................... | 188/73.38 |
| 4,775,034 | 10/1988 | Pachner et al. ...................... | 188/73.45 |
| 5,381,875 | 1/1995 | Tsuruta et al. ....................... | 188/73.38 |
| 5,472,067 | 12/1995 | Fujiwara .............................. | 188/73.38 |
| 5,564,532 | 10/1996 | Baba et al. ........................... | 188/73.47 |
| 5,577,577 | 11/1996 | Hirai et al. ........................... | 188/73.38 |

*Primary Examiner*—Robert J. Oberleitner
*Assistant Examiner*—Chris Schwartz
*Attorney, Agent, or Firm*—Rodney F. Brown

[57] ABSTRACT

A disk brake assembly for a trailer includes a rotor, inner and outer brake pads, a mounting bracket, upper and lower pad retention assemblies, a caliper assembly and a clamping arm. The rotor is a disk having the inner and outer brake pads positioned on opposite sides thereof. The mounting bracket, in cooperation with the upper and lower pad retention assemblies, maintains the position of the inner and outer brake pads relative to the rotor. The mounting bracket has a body with an upper arm and a lower arm extending therefrom. The upper arm has a downwardly-facing guide surface and the lower arm has an upwardly-facing guide surface. Each pad retention assembly includes an engagement sleeve, a clamping arm coupling and a pair of "U"-shaped spring sections connecting the engagement sleeve and clamping arm coupling. The upper engagement sleeve is mounted on the guide surface of the upper arm and the lower engagement sleeve is mounted on the guide surface of the lower arm. Each brake pad has an upper groove and a lower groove slidingly received by the upper and lower engagement sleeves, respectively. The caliper assembly is mounted on the mounting bracket and houses an actuatable piston adjacent the inner brake pad. The clamping arm is a flexibly configured structure connected to the caliper assembly. The clamping arm biases the outer brake pad inwardly against the outer side of the rotor when the actuated piston biases the inner brake pad against the inner side of the rotor. Flexure of the clamping arm desirably dampens pressure spikes generated by the brake actuator of the trailer and delivered to the caliper assembly.

19 Claims, 6 Drawing Sheets

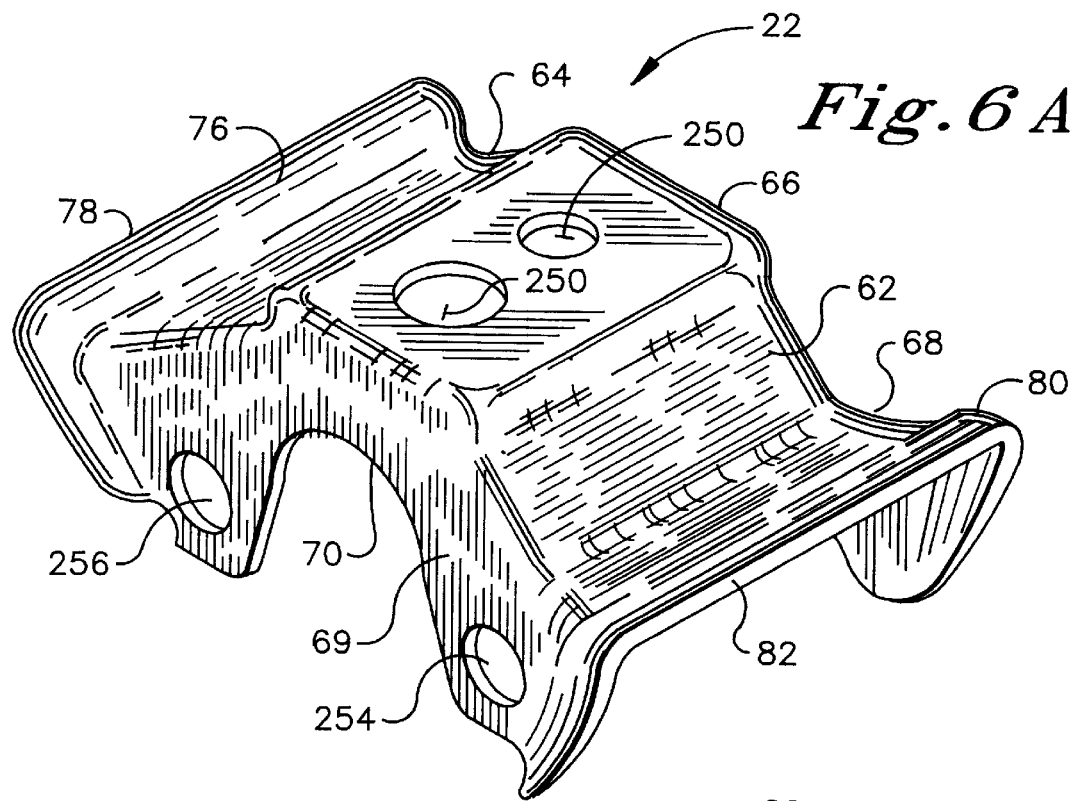
Fig. 6A
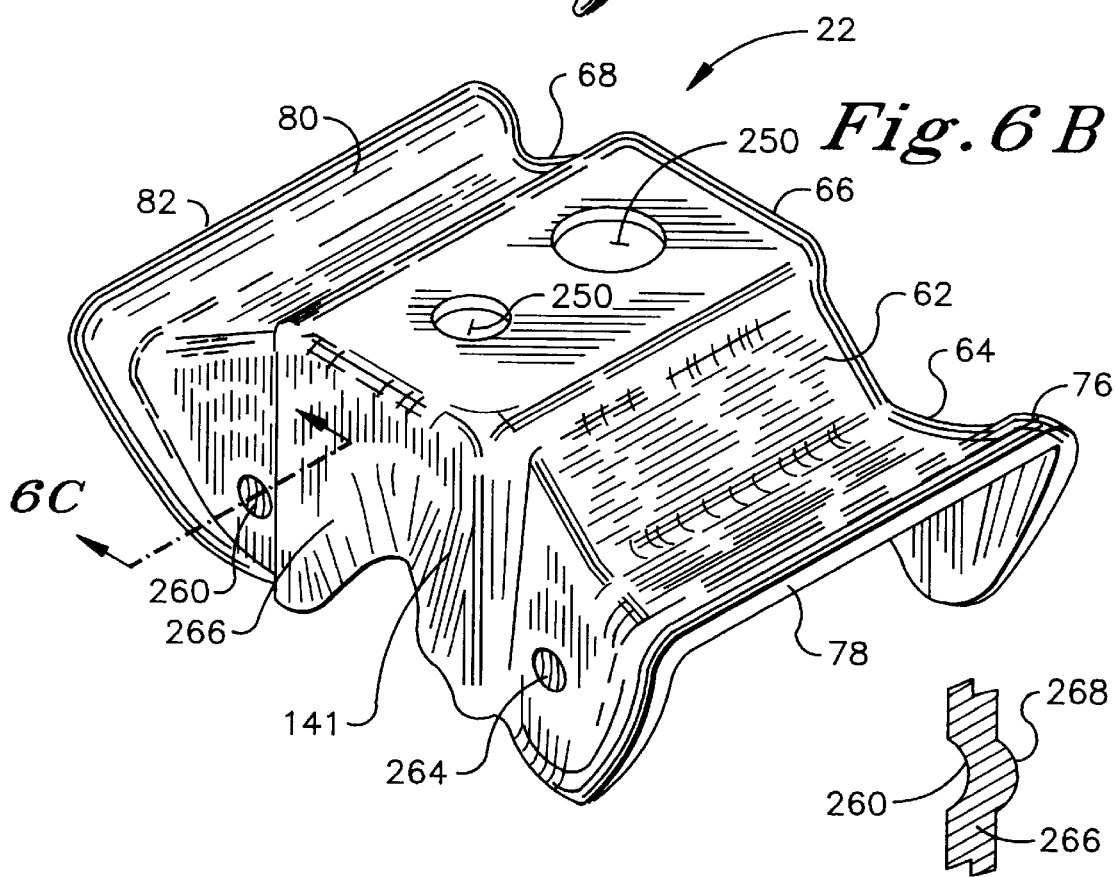
Fig. 6B
Fig. 6C

DISK BRAKE ASSEMBLY FOR WHEEL OF A TRAILER

TECHNICAL FIELD

The present invention relates generally to a brake assembly for a wheel, and more particularly to a disk brake assembly for a wheel of a trailer.

BACKGROUND OF THE INVENTION

When a trailer is coupled with-a towing vehicle, the trailer is usually provided with its own set of brake assemblies distinct from those of the towing vehicle to improve the braking performance of the towing vehicle and trailer in tandem. In the absence of separate brake assemblies for the trailer and towing vehicle, the ability of the operator to control the towing vehicle is diminished due to increased force on the rear end of the towing vehicle caused by the unrestrained trailer. The combined weight of the towing vehicle and trailer may also exceed the braking capacity of the towing vehicle or cause excessive brake wear to the towing vehicle. Although the brake assemblies of the trailer and towing vehicle may be constructed somewhat differently to satisfy different performance characteristics, the brake assemblies of both the trailer and the towing vehicle are typically classified as either drum brakes or disk brakes.

Disk brakes are often preferred over drum brakes due to improved braking performance, increased durability and lower maintenance requirements. A disk brake assembly generally includes a rotor, a pair of brake pads on opposing sides of the rotor, calipers in communication with the brake pads, and one or more components for mounting the disk brake assembly on an associated axle and wheel of a trailer or towing vehicle and for maintaining the desired position of the rotor, pads and calipers relative to one another and relative to the associated axle and wheel. The mounting components are typically made of cast iron for enhanced mass and rigidity. It is noted, however, that cast iron is susceptible to rust and corrosion that can potentially impede the performance of the dynamic components of the disk brake assembly, such as the brake pads, if allowed to build up in critical locations on the disk brake assembly. Nevertheless, rust and corrosion do not usually accumulate on the brake assemblies of motorized vehicles in quantities sufficient to diminish the brake performance thereof because rust and corrosion are eradicated by use of the vehicle.

In contrast, trailers are commonly stored outside for extended periods of time in a state of disuse because trailers are frequently used to carry recreational vehicles, such as boats or snowmobiles, having seasonal utility. During such periods of disuse, the susceptibility of the cast iron components to rust and corrosion is heightened. Trailers are also commonly exposed to salt water in coastal locations, thereby creating an extremely corrosive environment for the cast iron components. The presence of rust or corrosion can impede the operation of the brake assembly and in extreme cases can cause the brake pads to become locked or frozen to the other components of the brake assembly, preventing operation of the brakes entirely without costly maintenance to free the brake pads. Freezing up of the brake pads is a potentially hazardous condition that may or may not be readily detectable prior to using the trailer.

Although, as noted above, some structural modifications may exist between the brake assemblies of a trailer and a towing vehicle, the brake assemblies of the trailer and towing vehicle are preferably designed to be actuated in cooperation with one another by an operator in the towing vehicle. The brake assemblies of the towing vehicle are typically actuated when the operator of the towing vehicle depresses a brake pedal in the cab of the towing vehicle, thereby pressurizing the hydraulic brake fluid line of the towing vehicle braking assemblies. The towing vehicle slows upon actuation of the towing vehicle brake assemblies, causing the trailer to press against the towing vehicle. A brake actuator mounted on the trailer between the trailer and towing vehicle is consequently depressed, thereby pressurizing the hydraulic brake fluid lines of the trailer braking assemblies. Pressure spikes in the hydraulic brake fluid lines of the brake assemblies can cause uneven braking or grabbing. If pressure spikes reach the disk brake assemblies of the trailer, particularly dangerous braking conditions can occur. For example, pressure spikes can cause the brake assemblies of the trailer to respond to actuation more rapidly or more forcefully than the brake assemblies of the towing vehicle, either of which adversely impacts the handling of the towing vehicle and trailer.

Accordingly, it is an object of the present invention to provide a disk brake assembly overcoming the problems encountered with prior art disk brakes such as those described above. More particularly, it is an object of the present invention to provide such a disk brake assembly that has specific utility to trailers. More particularly still, it is an object of the present invention to reduce or eliminate the effect of pressure spikes on the braking performance of a disk brake assembly for trailers. It is another object of the present invention to prevent the dynamic components of the disk brake assembly from freezing up due to rust or corrosion. It is yet another object of the present invention to improve the operation, maintenance and durability of a disk brake assembly for trailers. These objects and others are achieved by the present invention described hereafter.

SUMMARY OF THE INVENTION

The present invention is a disk brake assembly for a wheel, and preferably for a wheel of a trailer. The disk brake assembly includes a rotor, inner and outer brake pads, a mounting bracket, upper and lower pad retention assemblies, a caliper assembly and a clamping arm. The rotor is a disk having an arcuate perimeter, an inner braking face and an outer braking face. The inner and outer brake pads have inner and outer braking faces that are positioned adjacent the inner and outer braking faces of the rotor, respectively. The mounting bracket, in cooperation with the upper and lower pad retention assemblies, maintains the position of the inner and outer brake pads relative to the rotor. The mounting bracket has a body with an upper arm and a lower arm extending therefrom. The upper arm has a downwardly-facing guide surface formed thereon and the lower arm has an upwardly-facing guide surface formed thereon. Each pad retention assembly includes an engagement sleeve, a clamping arm coupling and a pair of "U"-shaped spring sections connecting the engagement sleeve and clamping arm coupling. The pad retention assembly prevents the clamping arm and mounting bracket from rattling during operation of the disk brake assembly.

The upper engagement sleeve is mounted on the downwardly-facing guide surface of the upper arm and the lower engagement sleeve is mounted on the upwardly-facing guide surface of the lower arm. Each brake pad has an upper groove and a lower groove slidingly received by the upper and lower engagement sleeves, respectively. The caliper assembly is partially mounted to the mounting bracket and houses an actuatable biasing member adjacent the inner brake pad that biases the inner braking face of the inner brake pad against the inner braking face of the rotor when actuated. The clamping arm is a flexibly configured structure attached to the caliper assembly that biases the outer braking face of the outer brake pad inwardly against the outer braking face of the rotor when the biasing member is actuated. Flexure of the clamping arm desirably dampens pressure spikes that are generated by the brake actuator and delivered to the caliper assembly. The present invention will be further understood, both as to its structure and operation, from the accompanying drawings, taken in conjunction with the accompanying description, in which similar reference characters refer to similar parts.

BRIEF DESCRIPTION OF THE DRAWINGS

FIG. 6A is a perspective view of the inner side of the clamping arm of FIG. 1.

FIG. 6B is a perspective view of the outer side of the clamping arm of FIG. 1.

FIG. 6C is a partial cross-sectional view of a sidewall of the clamping arm of FIG. 6B taken along line 6C—6C.

DESCRIPTION OF PREFERRED EMBODIMENTS

Figure 1:
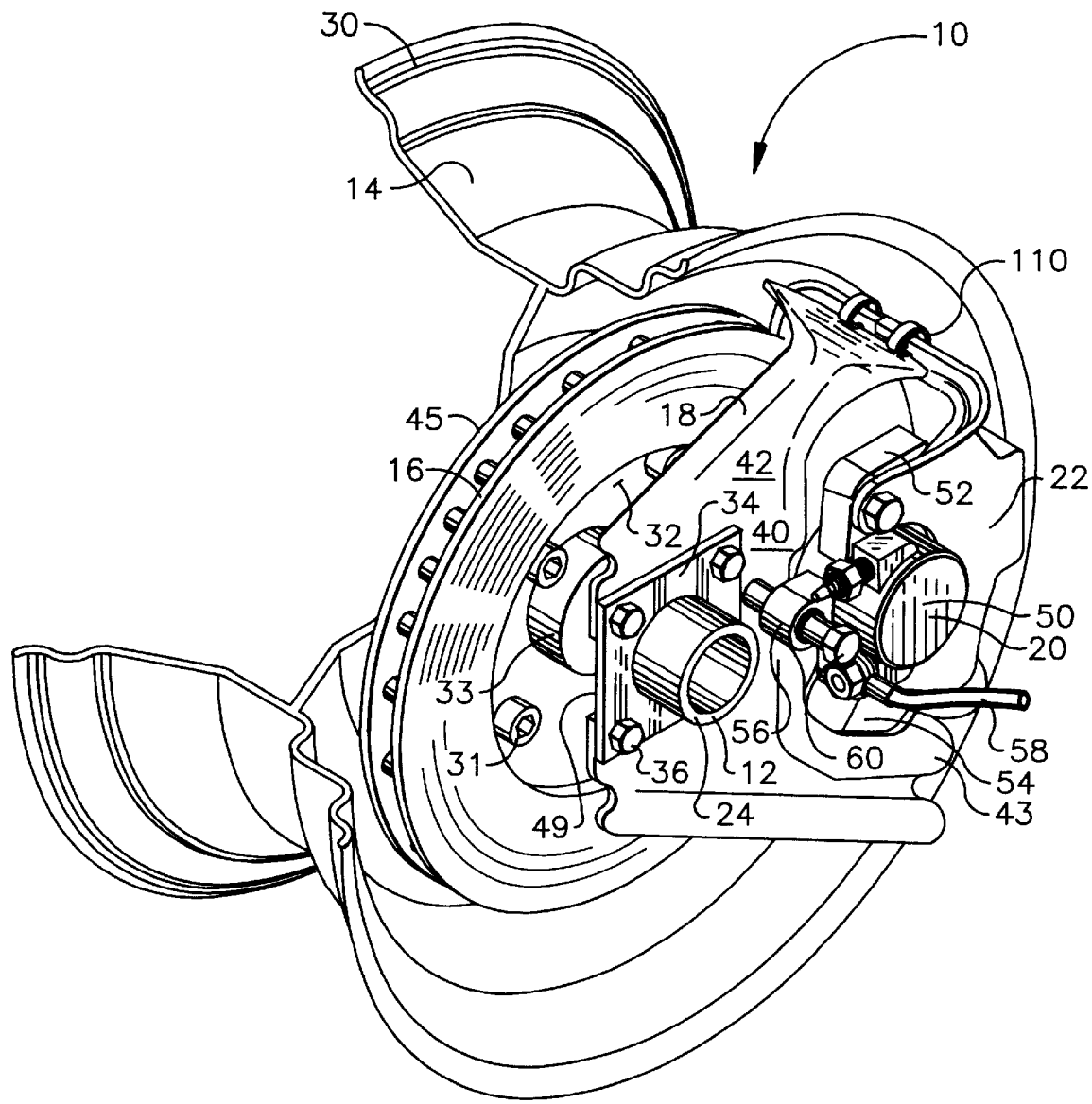
FIG. 1 is a perspective view of an inner side of a disk brake assembly in accordance with the present invention, wherein the disk brake assembly is operably mounted on an axle assembly and associated wheel.
Figure 2:
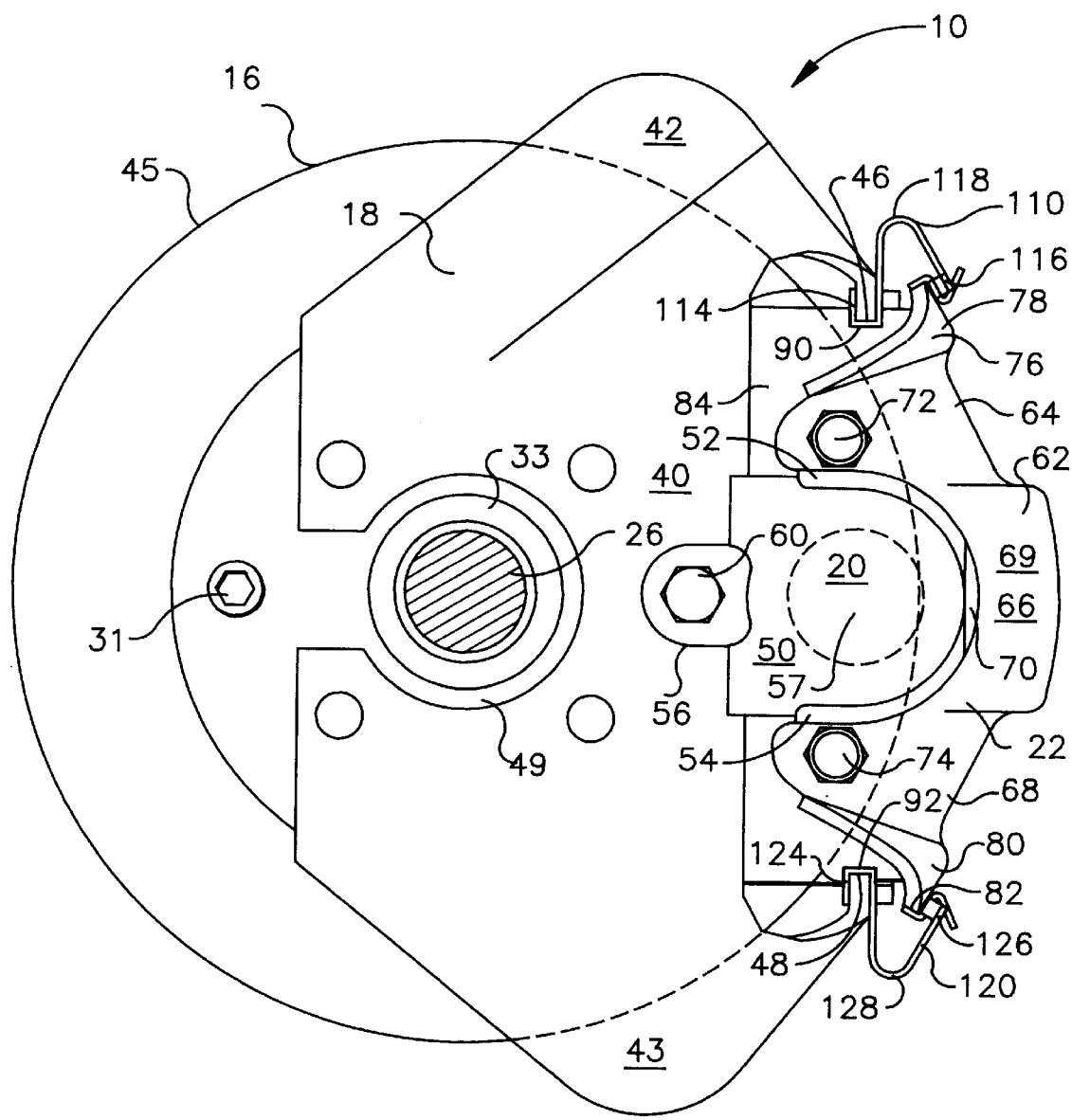
FIG. 2 is an elevational view of the inner side of the disk brake assembly of FIG. 1.

Referring initially to FIGS. 1 and 2, a disk brake assembly of the present invention, generally designated 10, is shown operatively mounted on an axle assembly 12 and a wheel 14, wherein the wheel 14 is rotatably coupled to the axle assembly 12. The disk brake assembly 10 comprises a rotor 16, a mounting bracket 18, a caliper assembly 20 and a clamping arm 22. The axle assembly 12 is conventional, comprising an axle member 24 extending under an associated vehicle, preferably a trailer (not shown), and a spindle 26 extending from the end of the axle member 24. The wheel 14 is likewise conventional, comprising a hub 28 (shown in FIG. 3) at the center of the wheel 14 and a rim 30 positioned concentrically around the hub 28 and removably attached thereto by means of lugs 31 and lug nuts (not shown). A tire (not shown) is mounted on the rim 30. The hub 28 is connected to the spindle 26 in a conventional manner such that the entire wheel 14 is rotatable relative to the stationary axle assembly 12.

The rotor 16 of the disk brake assembly 10 has a disk configuration with a central circular opening 32 to receive a cylindrical portion 33 of the hub 28. The rotor 16 concentrically engages the hub 28 such that the rotor 16 is fixed relative to the wheel 14, but is rotatable relative to the stationary axle assembly 12. Although the rotor 16 and hub 28 are shown and described herein as being two distinctly separate, but interconnected units, it is apparent to the skilled artisan that the rotor 16 and hub 28 can alternatively be integrally constructed as a single unit. In any case, the mounting bracket 18 is fixedly connected to the axle assembly 12 by means of a mounting plate 34 and a plurality of bolt fasteners 36. The mounting bracket 18 has an approximately "C"-shaped configuration opening in a radially outward direction relative to the rotor 16. The mounting bracket 18 includes a body 40 connecting an upper arm 42 and a lower arm 43. A narrow vertical support strap 44 (shown in FIG. 4), however, is provided across the mouth of the "C" extending from the upper arm 42 to the lower arm 43 along an arcuate pathway radially outside of the rotor 16 that parallels the arcuate perimeter 45 of the rotor 16. The upper arm 42 extends in an upward direction away from the body 40 to an upper extension position radially outside of the rotor 16 and provides a downwardly-facing guide surface 46 at the upper extension position. The lower arm 43 extends in a downward direction away from the body 40 to a lower extension position radially outside of the rotor 16 and provides an upwardly-facing guide surface 48 at the lower extension position. An arcuate opening 49 in the body 40 provides clearance for the spindle 26 to pass therethrough.

The caliper assembly 20 includes a housing 50, an upper flange 52 projecting in an upward direction from the housing 50, a lower flange 54 projecting in a downward direction from the housing 50, a middle connecting flange 56 extending in a radially inward direction relative to the rotor 16 from the housing 50, a biasing member 57, such as a pressure-actuated piston 57, positioned within the interior of the housing 50, and a brake fluid line 58 engaging the housing 50. The brake fluid line 58 contains a selectively pressurizable brake fluid that is in fluid communication with the piston 57. A bolt fastener 60 is slidably received by a bore (not shown) in the middle connecting flange 56 of the caliper assembly 20 and secured to the body 40 of the mounting bracket 18. The fastener 60 slidably attaches the caliper assembly 20 to the mounting bracket 18.

The clamping arm 22 has an approximately arcuate symmetrical profile that extends along an arcuate pathway radially outside of the rotor 16 and support strap 44, paralleling the arcuate perimeter of the rotor 16. The clamping arm 22 includes a central body 62 having an upper section 64, a middle section 66, and a lower section 68, wherein the upper, middle and lower sections 64, 66, 68 are integrally formed, with the upper and lower sections 64, 68 being symmetrically disposed on opposite ends of the middle section 66. The upper and lower sections 64, 68 have substantially the same dimensional configuration to possess substantially the same flexing capability. The clamping arm 22 further includes an inner side 69 extending radially inward from the central body 62. A radially inner edge of the middle section 66 defines an opening 70 for receiving the body 50 of the caliper assembly 20. A pair of bolt fasteners 72, 74 attach the inner side 69 of the clamping arm 22 to the upper and lower flanges 52, 54, respectively, of the caliper assembly 20 such that the clamping arm 22 is symmetrically disposed about the caliper assembly 20. The upper section 64 of the clamping arm 22 has an upwardly extending flange 76 that defines an upper engaging surface 78. The lower section 68 of the clamping arm 22 has a downwardly extending flange 80 that defines a lower engaging surface 82.

Figure 3:
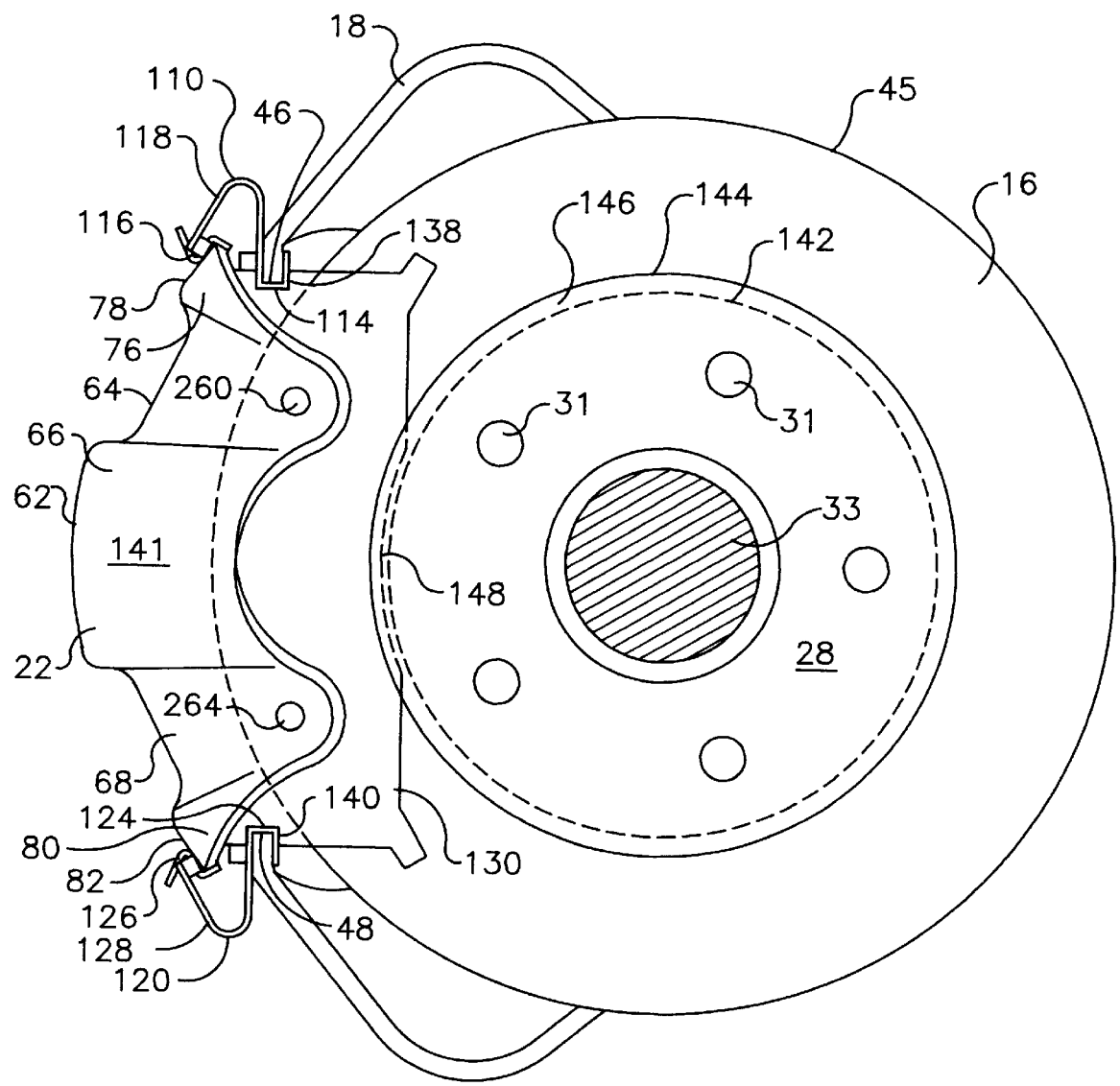
FIG. 3 is an elevational view of the outer side of the disk brake assembly of FIG. 1.
Figure 4:
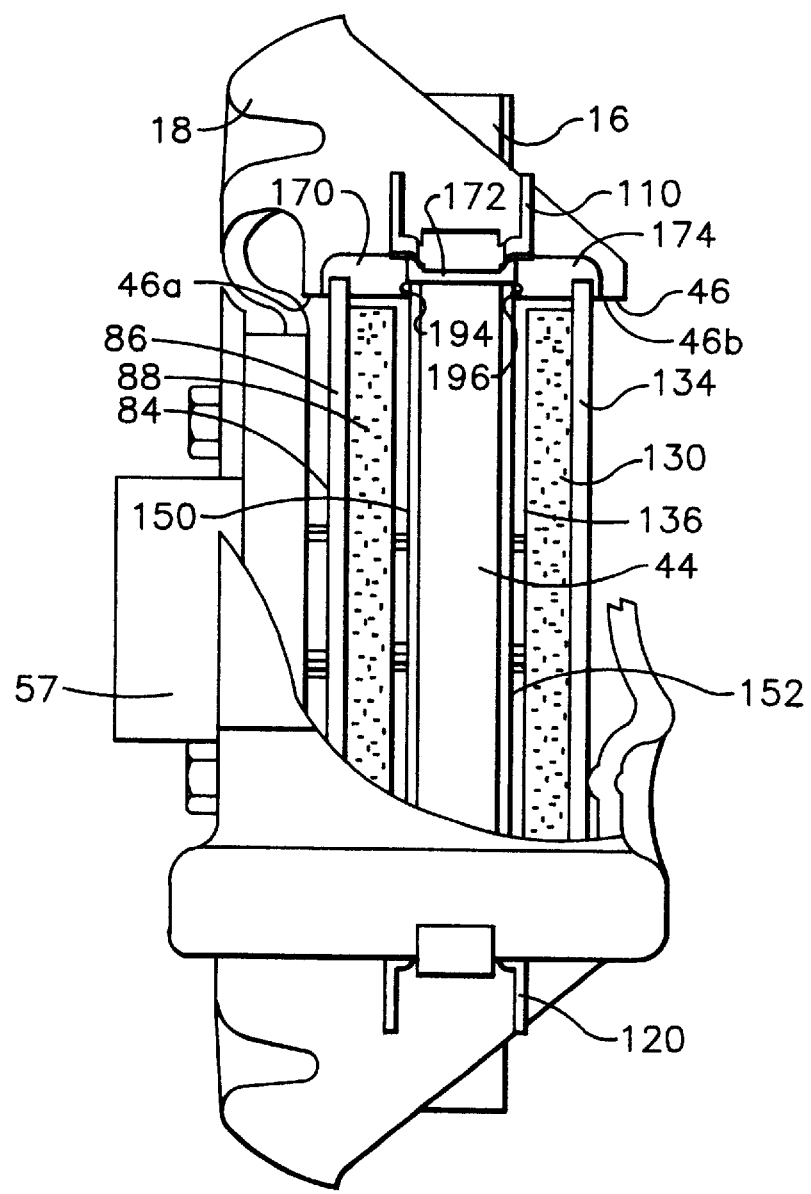
FIG. 4 is an end view of the disk brake assembly of FIG. 1, wherein the clamping arm is partially removed.

Referring further to FIGS. 3 and 4, as well as FIGS. 1 and 2, the disk brake assembly 10 additionally comprises an inner brake pad 84 having a support plate defining an inner actuation face 86, an inner braking face 88, an upper groove 90 and a lower groove 92. The inner brake pad 84 is positioned behind the caliper assembly 20 and clamping arm 22 such that the piston 57 of the caliper assembly 20 is in selective engagement with the inner actuation face 86. The upper and lower grooves 90, 92 slidably receive the downwardly-facing and upwardly-facing guide surfaces 46, 48, respectively, of the mounting bracket 18. The disk brake assembly 10 further has an upper pad retention assembly generally designated 110. The upper pad retention assembly 110 includes an engagement sleeve 114 having an inner surface that engages the downwardly-facing guide surface 46 of the mounting bracket 18. An outer surface of the engagement sleeve 114 contacts the upper groove 90 of the inner brake pad 84. The upper pad retention assembly 110 also includes a clamping arm coupling 116 that contacts the upper engaging surface 78 of the upwardly extending flange 76. An arcuate middle section 118 flexibly joins the engagement sleeve 114 and the clamping arm coupling 116.

A lower pad retention assembly, generally designated 120, is likewise provided that includes an engagement sleeve 124 having an inner surface engaging the upwardly-facing guide surface 48 of the mounting bracket 18. An outer surface of the engagement sleeve 124 contacts the lower groove 92 of the inner brake pad 84. The lower pad retention assembly 120 also includes a clamping arm coupling 126 that contacts the lower engaging surface 82 of the downwardly extending flange 80. An arcuate middle section 128 flexibly joins the engagement sleeve 124 to the clamping arm coupling 126.

The disk brake assembly 10 additionally comprises an outer brake pad 130 having a support plate defining an outer actuation face 134, an outer braking face 136, an upper groove 138 and a lower groove 140. The outer brake pad 130 is positioned interior to the clamping arm 22. The clamping arm 22 has an outer side 141 extending radially inward from the central body 62 that in association with the central body 62 and the inner side 69 defines a "U"-shaped cross-section. The outer side 141 is in selective engagement with the outer actuation face 134. The upper and lower grooves 138, 140 slidably receive the downwardly-facing and upwardly-facing guide surfaces 46, 48, respectively, of the mounting bracket 18. It is noted that the hub 28 has an inner diameter 142 and an outer diameter 144 that define an annular slot 146 providing clearance for an inner arcuate edge 148 of the outer actuation face 134. The rotor has an inner braking face 150 to selectively engage the inner braking face 88 of the inner brake pad 84 and an outer braking face 152 to selectively engage the outer braking face 136 of the outer brake pad 130.

Figure 5A:
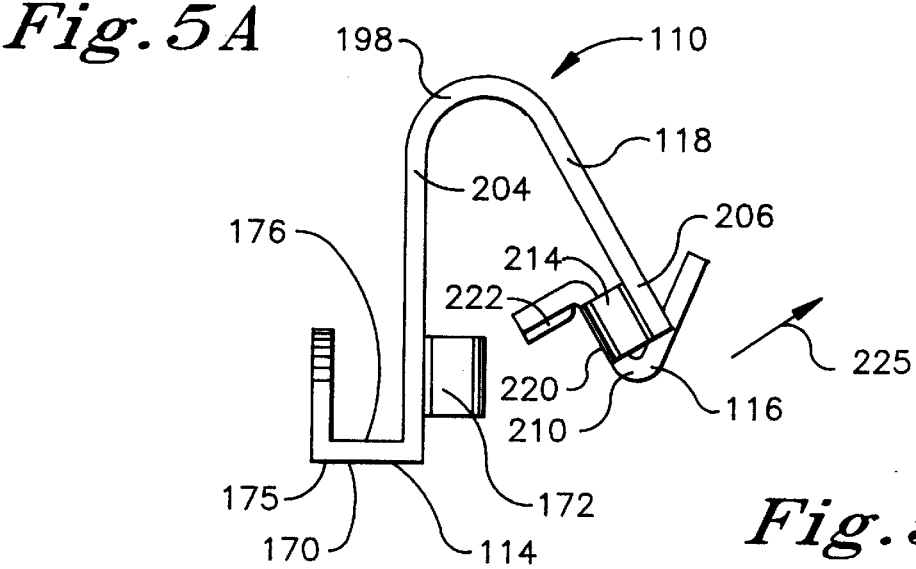
FIG. 5A is an enlarged elevational view of a pad retention assembly of FIG. 1.
Figure 5B:
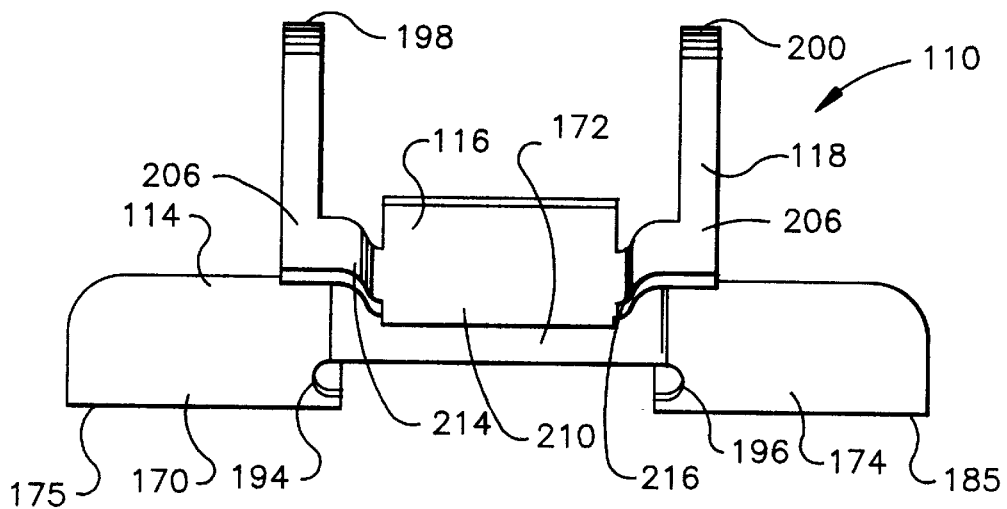
FIG. 5B is an enlarged frontal view of a pad retention assembly of FIG. 1.
Figure 5C:
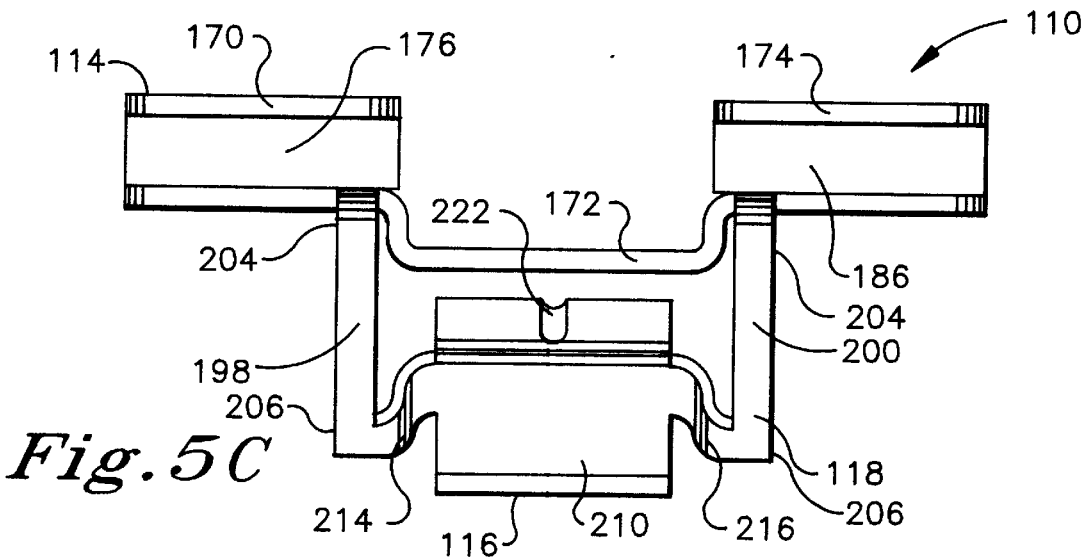
FIG. 5C is an enlarged plan view of a pad retention assembly of FIG. 1.

Referring to FIGS. 5A, 5B, and 5C, the upper pad retention assembly 110 is shown in greater detail. The lower pad retention assembly 120 preferably has the same construction as the upper pad retention assembly 110. Accordingly, the following description of the upper pad retention assembly 110 applies correspondingly to the lower pad retention assembly 120. The engagement sleeve 114 of the upper pad retention assembly 110 has an inner section 170 connected by a central section 172 to an outer section 174. The inner section 170 has an outer surface 175 that slidably engages the upper groove 90 of the inner brake pad 84 and an inner surface 176 that engages a first portion 46$a$ of the downwardly-facing guide surface 46 of the mounting bracket 18. The outer section 174 has an outer surface 185 that slidably engages the upper groove 140 of the outer brake pad 130 and an inner surface 186 that engages a second portion 46$b$ of the downwardly-facing guide surface 46 of the mounting bracket 18. The central section 172 of the engagement sleeve 114 is a "U"-shaped member. The central section 172 has surfaces 194, 196 which extend downwardly to the inner section and outer section 170, 174, respectively, and engage the support strap 44 of the mounting bracket 18 as shown in FIG. 4.

The arcuate middle section 118 of the upper pad retention assembly 110 comprises first and second "U"-shaped spring sections 198, 200 that connect one end 204 thereof to the sleeve 114 and an opposite end 206 thereof to the clamping arm coupling 116. The clamping arm coupling 116 includes a "Z"-shaped member 210 that is connected to and centered between the ends 206 of the first and second "U"-shaped spring sections 198, 200 by first and second curved sections 214, 216. An inner surface 220 of "Z"-shaped member 210 contacts the upper engaging surface 78 of the upwardly extending flange 76. A ridge 222 is provided in the "Z"-shaped member 210 that is received by a corresponding indentation (not shown) in the upwardly extending flange 76 to maintain the position of the upper pad retention assembly 110 relative to the clamping arm 22. The upper engaging surface 78 of the upwardly extending flange 76 biases the clamping arm coupling 116 of the pad retention assembly 110 radially outward as indicated by an arrow 225. The pad retention assembly 110 is preferably formed from a high-strength metal to enhance the durability thereof.

Referring to FIGS. 6A, 6B, and 6C, the clamping arm 22 is shown in greater detail. The clamping arm 22 has one or more bores 250 formed in the middle section 66 for releasing heat generated by the friction between the brake pads 84, 130 and the rotor 16 during brake operation. The bores 250 also provide a window that allows the brake pads 84, 130 to be inspected for wear without disassembling the disk brake assembly 10. Additional bores 254, 256 are formed in the inner side 69 of the clamping arm 22 to receive the fasteners 72, 74. Indentations 260, 264 are formed in the outside of a wall 266 of the outer side 141 of the clamping arm 22 causing corresponding projections 268 on the inside of the wall 266. The projections 268 selectively engage the outer actuation face 134 of the outer brake pad 130.

Operation of the present disk brake assembly 10 in association with a trailer and a towing vehicle is initiated by pressurizing the brake fluid in the line 58 in a conventional manner. Pressurizing the brake fluid in the line 58 causes the piston 57 in the housing 50 of the caliper assembly 20 to extend away from the housing 50 and press against the inner actuation face 86 of the inner brake pad 84. Extension of the piston 57 urges the housing 50, and the inner side 69 of the clamping arm 22 fixedly contacted thereto, away from the inner brake pad 84, while drawing the outer side 141 of the clamping arm 22 against the actuation face 134 of the outer brake pad 130. As a result, the upper grooves 90, 138 and lower grooves 92, 140 of the inner and outer brake pads 84, 130, respectively, slide along the outer surfaces 175, 185 of the engagement sleeves 114, 124 of the upper and lower pad retention assemblies 110, 120. The net effect is that the distance between the inner and outer braking faces 88, 136 of the inner and outer brake pads 84, 130 is narrowed. Consequently, the inner and outer braking faces 88, 136 of the inner and outer brake pads 84, 130 engage the inner and outer braking faces 150, 152 of the rotor 16 causing friction between the inner braking faces 88, 150 and between the outer braking faces 136, 152, respectively, that slows rotation of the rotor 16 and associated trailer wheel 14 to provide a braking response.

The braking performance of the present disk braking assembly 10 in association with a trailer is enhanced by the specific characteristics of the clamping arm 22 and the upper and lower pad retention assemblies 110, 120. In particular, the upper and lower pad retention assemblies 110, 120 are configured such that when properly positioned within the disk brake assembly 10, the "U"-shaped spring sections 198, 200 of each pad retention assembly 110, 120 are stressed outwardly away from the rotor 16 by the clamping arm 22 as shown by arrow 225 in FIG. 5A. Thus, the stressed "U"-shaped spring sections 198, 200 exert a force in a direction opposite the arrow 225 against the upper and lower engaging surfaces 78, 82 of the clamping arm 22. Thus, the upper and lower pad retention assemblies 110, 120 effectively reduce or dampen vibration or rattling of the clamping arm 22 that may occur during operation of the disk brake assembly 10. It is further noted that the engagement sleeves 114, 124 of the upper and lower pad retention assemblies 110, 120 are preferably fabricated from a rust-resistant or corrosion-resistant material, such as stainless steel or the like, to facilitate slidable engagement of the inner and outer brake pads 84, 130 along the upper and lower pad retention assemblies 110, 120, particularly when the disk brake assembly 10 is mounted on a trailer that is submerged in salt water or that is used infrequently and stored under conditions that are susceptible to rust or corrosion.

The clamping arm 22 has an approximately arcuate profile with a "U"-shaped cross-section that enables a relatively high degree of flexibility, particularly under emergency or hard braking conditions. Consequently, the inner and outer sides 69, 141 bow out from the central body 62 under severe braking loads. The relative flexibility of the clamping arm 22 is enhanced by the material of construction. The clamping arm 22 is preferably formed into the present configuration from a high-strength sheet metal. Although it is apparent that the clamping arm 22 carries a substantial load when the piston 57 presses against the inner brake pad 84 due to the interconnective structure of the disk brake assembly 10, the present invention recognizes the desirability of providing a relatively high degree of flexibility in the clamping arm 22 to mitigate the impact of pressure spikes that may occur in the brake fluid line 58. If unaccounted for, pressure spikes can cause brakes to grab unevenly or prematurely, creating a condition termed "chucking" that is characterized by uncontrollable engagement and disengagement of the brakes. Chucking may ultimately result in loss of control of the trailer or towing vehicle. Because the clamping arm 22 of the present invention flexes substantially under severe braking loads, the clamping arm 22 serves as a damper, providing a more uniform and controlled braking response, particularly when pressure spikes occur. In contrast, conventional disk brake assemblies typically employ relatively stiffer materials, such as cast iron, for analogous structural components.

By mitigating pressure spikes, the relatively flexible clamping arm 22 of the present disk brake assembly 10 provides the trailer with a lagged or diminished braking response time relative to the towing vehicle having a conventional brake assembly. Consequently dangerous braking conditions due to pressure spikes occurring when the brake assembly of the trailer responds to actuation more quickly or more forcefully than that of the towing vehicle are reduced or avoided.

While the foregoing preferred embodiments of the invention have been described and shown, it is understood that alternatives and modifications, such as those suggested and others, may be made thereto and fall within the scope of the invention.

I claim:

1. A disk brake assembly comprising:
   a rotor having a first rotor braking face and a second rotor braking face;
   a caliper assembly positioned proximal to said first rotor braking face;
   a first brake pad positioned adjacent said first rotor braking face, wherein said caliper assembly biases said first brake pad against said first rotor braking face upon selective actuation of said caliper assembly;
   a second brake pad positioned adjacent said second rotor braking face;
   a clamping arm connected to said caliper assembly, wherein said clamping arm biases said second brake pad against said second rotor braking face upon selective actuation of said caliper assembly and wherein said clamping arm substantially flexes relative to said rotor to dampen a bias response of said first and second brake pads against said first and second rotor braking faces;
   a mounting bracket having a first guide surface and a second guide surface for guiding slidable movement of said first and second brake pads wherein said first and second guide surfaces are positioned adjacent said first and second brake pads;
   a first sleeve positioned on said first guide surface and a second sleeve positioned on said second guide surface; and
   a support strap connected to said first and second guide surfaces, wherein said support strap divides said first and second guide surfaces each into a first portion and a second portion.

2. The disk brake assembly recited in claim 1 wherein said first brake pad has a first groove and a second groove formed therein and said second brake pad has a first groove and a second groove formed therein and wherein said first grooves of said first and second brake pads slidably receive said first sleeve and said second grooves of said first and second brake pads slidably receive said second sleeve.

3. The disk brake assembly recited in claim 2 wherein said clamping arm has a first section having a first engaging surface, a middle section, and a second section having a second engaging surface.

4. The disk brake assembly recited in claim 3 further comprising first and second spring sections connected to said first and second sleeves, and first and second clamping arm couplings connected to said first and second spring sections, wherein said first engaging surface is in contact with said first clamping arm coupling and said first spring section is biased away from said rotor, and said second engaging surface is in contact with said second clamping arm coupling and said second spring section is biased away from said rotor.

5. The disk brake assembly recited in claim 4 wherein said first spring section has a first "U"-shaped section having an end connected to said first sleeve and a second "U"-shaped section having an end connected to said first sleeve.

6. The disk brake assembly recited in claim 5 wherein said clamping arm coupling has a "Z"-shaped member connected to ends of said first and second "U"-shaped sections opposite said ends connected to said first sleeve.

7. The disk brake assembly recited in claim 1 wherein said clamping arm is formed from sheet metal.

8. The disk brake assembly recited in claim 1 wherein said second side of said clamping arm has a projection formed therein to contact said second brake pad.

9. The disk brake assembly recited in claim 1 wherein said caliper assembly has first and second flanges and said clamping arm is mounted to said first and second flanges.

10. The disk brake assembly recited in claim 1 wherein said first and second sleeves each includes an outer section, a middle section and an inner section, wherein said outer section of said first and second sleeves engages said first portion of said first and second guide surfaces and said inner section of said first and second sleeves engages said second portion of said first and second guide surfaces, and said middle section of said first and second sleeves engages said support strap.

11. A disk brake assembly comprising:
a rotor having a first rotor braking face and a second rotor braking face;
a caliper assembly positioned proximal to said first rotor braking face;
a first brake pad positioned adjacent said first rotor braking face, wherein said caliper assembly biases said first brake pad against said first rotor braking face upon selective actuation of said caliper assembly;
a second brake pad positioned adjacent said second rotor braking face;
a clamping arm connected to said caliper assembly, wherein said clamping arm biases said second brake pad against said second rotor braking face upon selective actuation of said caliper assembly and wherein said clamping arm substantially flexes relative to said rotor to dampen a bias response of said first and second brake pads against said first and second rotor braking faces:
a mounting bracket having a first guide surface and a second guide surface for guiding slidable movement of said first and second brake pads wherein said first and second guide surfaces are positioned adjacent said first and second brake pads; and
a support strap connected to said first and second guide surfaces.

12. A disk brake assembly comprising:
a rotor having a first rotor braking face and a second rotor braking face;
a caliper assembly having a housing and a displacemnt member, said caliper assembly positioned proximal to said first rotor braking face;
first brake pad positioned adjacent said-first rotor braking face, wherein said displacement member biases said first brake pad against said first rotor braking face upon selective actuation of said caliper assembly;
a second brake pad positioned adjacent said second rotor braking face; and
a clamping arm substantially symmetrically disposed about said caliper assembly and connected to said caliper assembly, said clamping having a substantially symmetrical arcuate profile with middle, upper, and lower sections integrally formed in a unitary body from a sheet metal, said upper and lower sections being symmetrically disposed on opposite ends of sad middle section and said upper and lower sections having substantially the same dimensional configuration to possess substantially the same flexing capability, wherein said clamping arm biases said second brake pad against said second rotor braking face upon selective actuation of said caliper assembly and said clamping arm substantially flexes to dampen a bias response of said first and second brake pads against said first and second rotor braking faces.

13. The disk brake assembly recited in claim 12 further comprising a mounting bracket having a first guide surface and a second guide surface, a first sleeve positioned on said first guide surface, a second sleeve positioned on said second guide surface, wherein said first brake pad has a first groove and a second groove formed therein and said second brake pad has a first groove and a second groove formed therein and wherein said first grooves of said first and second brake pads slidably receive said first sleeve and said second grooves of said first and second brake pads slidably receive said second sleeve.

14. The disk brake assembly recited in claim 13 further comprising a support strap connected to said first and second guide surfaces, wherein said support strap divides said first and second guide surfaces each into a first portion and a second portion.

15. The disk brake assembly recited in claim 14 wherein said first and second sleeves each includes an outer section, a middle section and an inner section, wherein said outer section of said first and second sleeves engages said first portion of said first and second guide surfaces and said inner section of said first and second sleeves engages said second portion of said first and second guide surfaces, and said middle section of said first and second sleeves engages said support strap.

16. The disk brake assembly recited in claim 13 wherein said clamping arm has a first section having a first engaging surface, a middle section, and a second section having a second engaging surface.

17. The disk brake assembly recited in claim 16 further comprising first and second spring sections connected to said first and second sleeves, and first and second clamping arm couplings connected to said first and second spring sections, wherein said first engaging surface is in contact with said first clamping arm coupling and said first spring section is stressed away from said rotor, and said second engaging surface is in contact with said second clamping arm coupling and said second spring section is biased away from said rotor.

18. The disk brake assembly recited in claim 13 further comprising a support strap connected to said first and second guide surfaces.

19. The disk brake assembly recited in claim 12 wherein said housing has first and second flanges and said clamping arm is mounted to said first and second flanges.

* * * * *